United States Patent
MacNeill, Jr.

(10) Patent No.: US 10,757,909 B2
(45) Date of Patent: Sep. 1, 2020

(54) ANIMAL CONTAINER

(71) Applicant: Robert Andrew MacNeill, Jr., Durham, NC (US)

(72) Inventor: Robert Andrew MacNeill, Jr., Durham, NC (US)

(*) Notice: Subject to any disclaimer, the term of this patent is extended or adjusted under 35 U.S.C. 154(b) by 85 days.

(21) Appl. No.: 15/484,413

(22) Filed: Apr. 11, 2017

(65) Prior Publication Data

US 2017/0290288 A1    Oct. 12, 2017

Related U.S. Application Data

(60) Provisional application No. 62/320,671, filed on Apr. 11, 2016.

(51) Int. Cl.
*A01K 1/00* (2006.01)

(52) U.S. Cl.
CPC .................................. *A01K 1/0035* (2013.01)

(58) Field of Classification Search
CPC ...... A01K 1/0032; A01K 1/02; A01K 1/0209; A01K 1/0218; A01K 1/0227; A01K 1/0236; B65F 1/1615; B65F 1/0254; B65F 1/1436; B65F 1/1478; B65F 1/1623; B65F 1/0033
USPC ....... 119/417, 452, 492, 494, 496, 497, 498, 119/499, 500, 501, 512, 513, 515, 514; D30/108, 109, 110, 111, 112, 113, 114, D30/115, 116, 117, 118, 119, 120
See application file for complete search history.

(56) References Cited

U.S. PATENT DOCUMENTS

| | | | | |
|---|---|---|---|---|
| 2,522,391 A | * | 9/1950 | McGonigle | A01K 1/0245 119/453 |
| 3,226,015 A | * | 12/1965 | Manfredonia | B65F 1/06 232/43.2 |
| 3,322,477 A | * | 5/1967 | Armijo | B65F 1/06 312/211 |
| 3,654,733 A | * | 4/1972 | Blackwell | E06B 7/32 49/168 |
| 3,791,347 A | * | 2/1974 | Lovell | A01K 1/03 119/497 |
| 4,022,263 A | * | 5/1977 | Beckett | E06B 7/32 119/484 |
| 4,301,766 A | * | 11/1981 | Piccone | A01K 1/035 119/482 |
| D264,887 S | * | 6/1982 | Tweed | D30/112 |

(Continued)

OTHER PUBLICATIONS

Crystal Clear Pet Products LTD, www.crystalclearpet.com/shop/carrier/cat-carriers_buy.htm. Oct. 28, 2009.*

*Primary Examiner* — Ebony E Evans

(74) *Attorney, Agent, or Firm* — Dunlap Bennett & Ludwig, PLLC

(57) ABSTRACT

An animal container. The animal container includes a housing sized to fit an animal, such as a pet, within. The housing includes a plurality of sides. The plurality of sides includes a first side having a first opening leading into the housing and a second side having a second opening leading into the housing. A gate is secured to the housing and is spring biased in a closed position covering the first opening. The gate pivots against the spring bias in a direction towards an interior of the housing when a force is applied against the gate from outside of the housing. A first door is secured to the housing and covers the second opening.

6 Claims, 3 Drawing Sheets

(56) References Cited

U.S. PATENT DOCUMENTS

| | | | |
|---|---|---|---|
| 4,679,700 A * | 7/1987 | Tharrington | B65F 1/1607 |
| | | | 220/229 |
| 5,524,573 A * | 6/1996 | Hart | A01K 1/0245 |
| | | | 119/489 |
| 5,669,331 A | 9/1997 | Richmond | |
| 6,082,305 A | 7/2000 | Burns et al. | |
| 6,196,161 B1 | 3/2001 | Thurber | |
| 6,539,895 B2 * | 4/2003 | Hoagland | A01K 1/0245 |
| | | | 119/453 |
| 6,863,030 B2 | 3/2005 | Axelrod | |
| 7,673,825 B2 * | 3/2010 | Jeansonne | B02C 18/142 |
| | | | 241/100 |
| 8,607,738 B2 * | 12/2013 | Wilson | A01K 1/0107 |
| | | | 119/161 |
| 8,651,062 B2 | 2/2014 | Arsenault | |
| 10,244,909 B2 * | 4/2019 | Conrad | A47L 7/0047 |
| 2002/0092477 A1 | 7/2002 | Ross | |
| 2003/0116098 A1 | 6/2003 | Chrisco et al. | |
| 2006/0207517 A1 | 9/2006 | Mirsky | |
| 2008/0066689 A1 * | 3/2008 | Martz | A01K 1/0254 |
| | | | 119/497 |
| 2008/0216760 A1 | 9/2008 | Cannon et al. | |
| 2010/0031895 A1 * | 2/2010 | Pierpont | A01K 1/033 |
| | | | 119/499 |
| 2010/0175633 A1 | 7/2010 | Krauss et al. | |
| 2010/0313824 A1 | 12/2010 | Northrop et al. | |
| 2013/0341328 A1 * | 12/2013 | Schneider | B65F 1/1607 |
| | | | 220/259.2 |
| 2014/0150728 A1 | 6/2014 | Tamiozzo | |

\* cited by examiner

ANIMAL CONTAINER

CROSS-REFERENCE TO RELATED APPLICATION

This application claims the benefit of priority of U.S. provisional application No. 62/320,671, filed Apr. 11, 2016, the contents of which are herein incorporated by reference.

BACKGROUND OF THE INVENTION

The present invention relates to transporting animals and, more particularly, to an animal container for transporting animals.

It is often difficult to load an animal into a container for transportation, especially if the container requires the user to manually operate an entry door and at the same time hold and insert an uncooperative animal into the container. Placing an uncooperative animal into a container, whether a pet carrier or crate, is a difficult process with a low success rate.

As can be seen, there is a need for an improved animal container for transporting animals.

SUMMARY OF THE INVENTION

In one aspect of the present invention, an animal container comprises: a housing sized to fit an animal within, wherein the housing comprises a plurality of sides, wherein a first side comprises a first opening and a second side comprises a second opening; a gate secured to the housing and spring biased in a closed position covering the first opening, wherein the gate pivots against the spring bias in a direction towards an interior of the housing when a force is applied against the gate from outside of the housing; and a first door secured to the housing and covering the second opening.

In another aspect of the present invention, an animal container comprises: a housing sized to fit an animal within, wherein the housing comprises a plurality of sides comprising a top, a bottom opposite the top, a first side, a second side opposite the first side, a front and a rear opposite the front, wherein a first opening is formed through the top and a second opening is formed through the front; a plurality of arms made of a flexible resilient material attached to the housing and covering the first opening, wherein a proximal end of each of the plurality of arms alternate between being attached to opposing sides of the first opening; and a door secured to the housing and covering the second opening.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

It is an object of the present invention to ameliorate the difficulties encountered when attempting to load an uncooperative animal into a container for transportation, particularly where the user is obliged to manually operate an entry door and at the same time hold and insert an uncooperative animal into the container.

The above and other objects are realized by the present invention, one embodiment of which contemplates a small animal container provided with a portal in the top of the carrier that allows the user to lower the animal into the carrier easily without having to separately open or operate a door. The portal is also equipped with a mechanism that allows ingress but prevents movement in the opposite direction.

Existing animal carriers require the user to operate a door or other portal mechanically with the users own hands, whether to open or close it or both, while at the same time preoccupied with handling an often uncooperative animal. The device of the present invention enables the user to lower the animal into the container, with the weight of the animal alone being sufficient to operate the one-way portal. The portal automatically closes to prevent egress.

Figure 1:
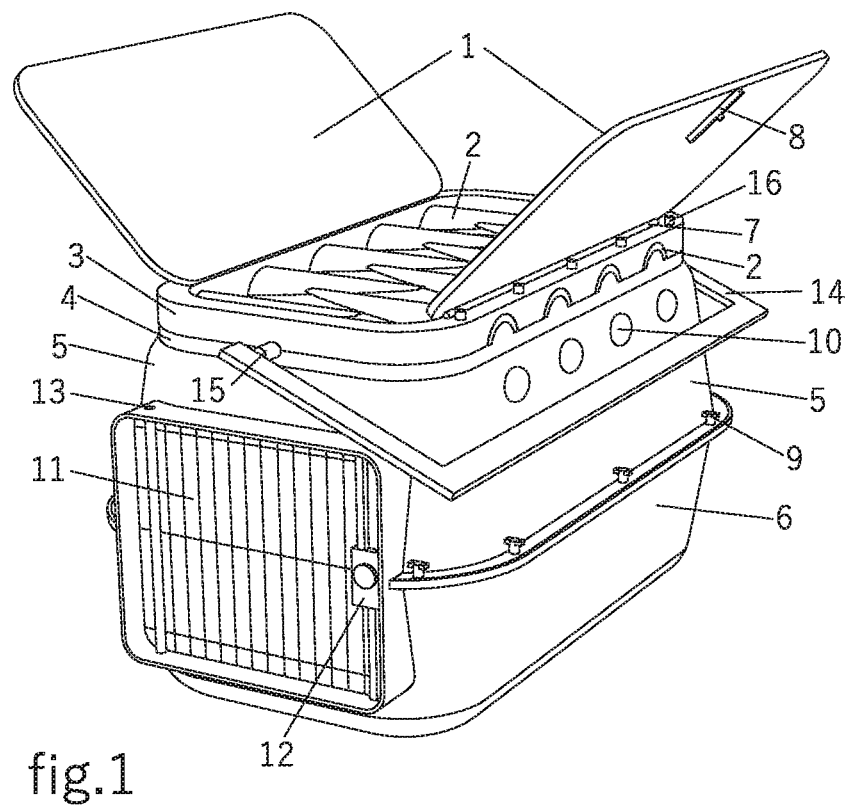
FIG. 1 is a perspective view of an embodiment of the present invention in an open position.
Figure 2:
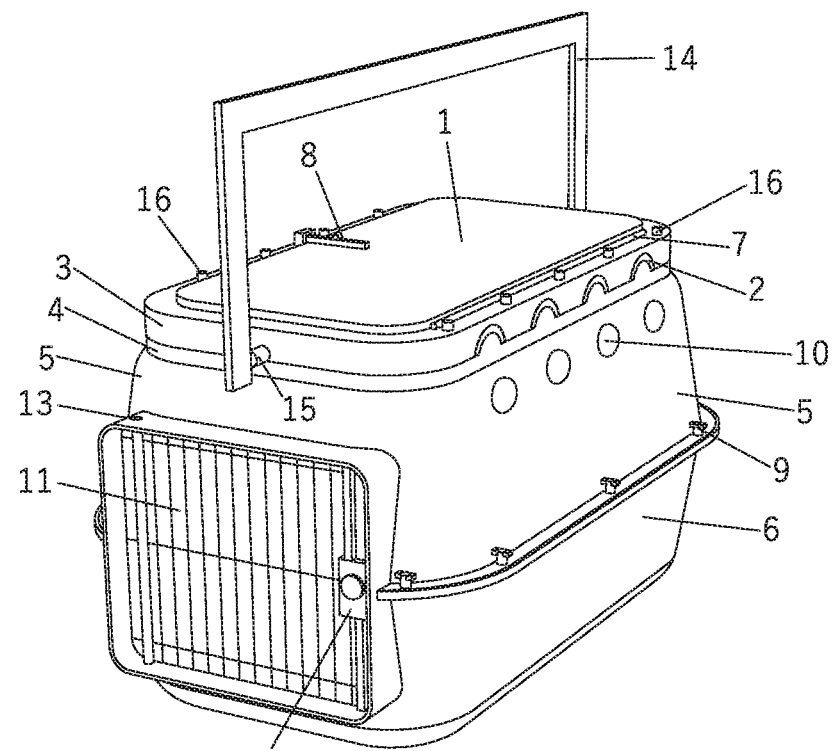
FIG. 2 is a perspective view of an embodiment of the present invention in a closed position.
Figure 3:
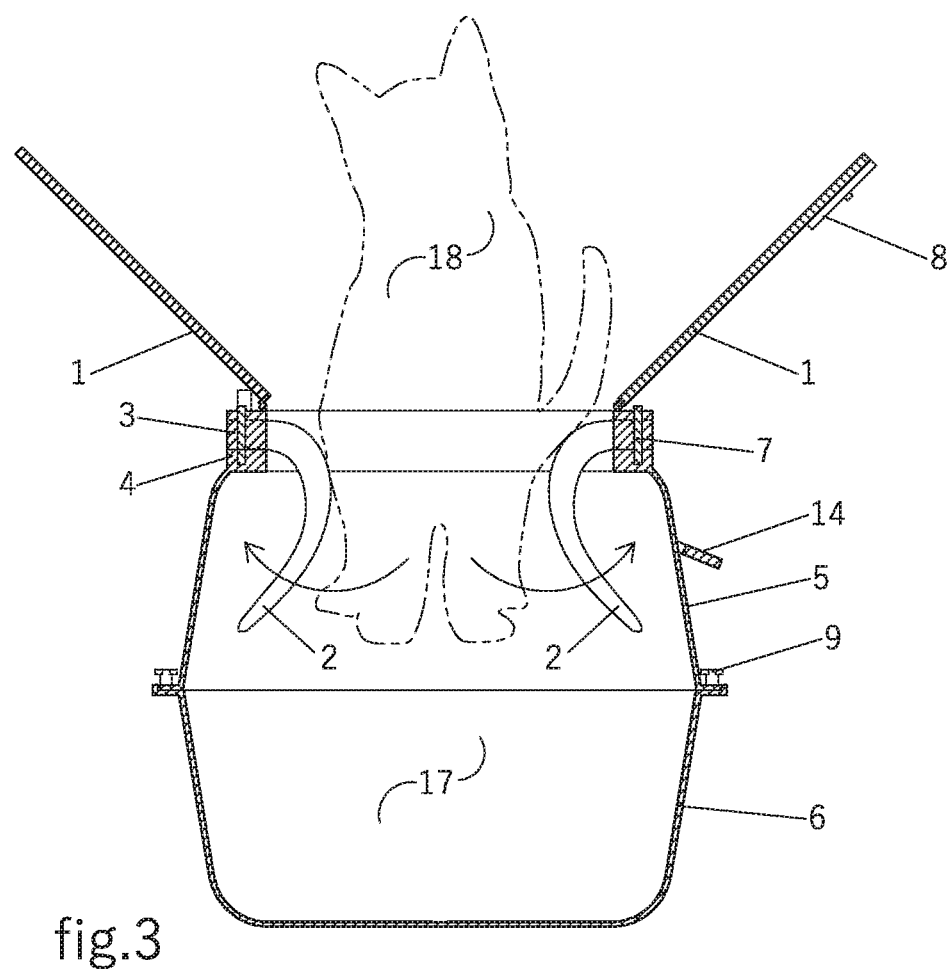
FIG. 3 is a section view of an embodiment of the present invention in use.
Figure 4:
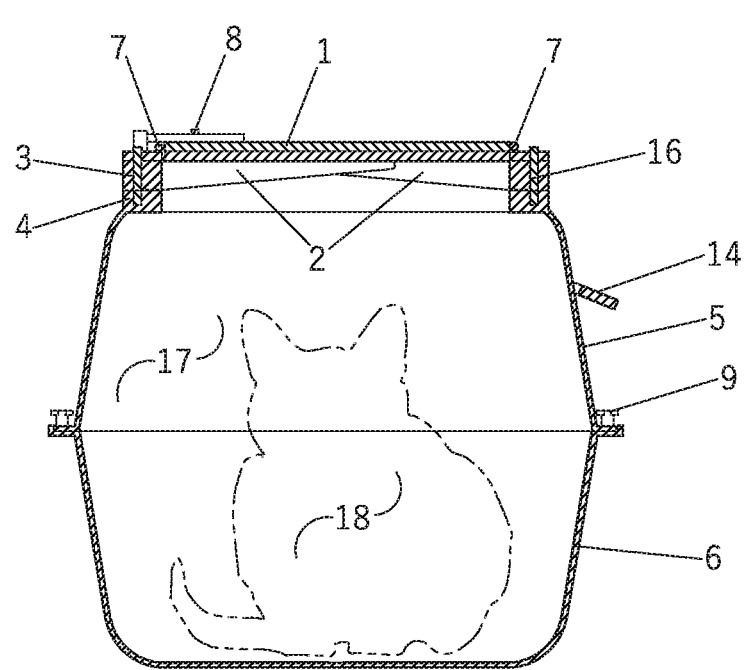
FIG. 4 is a section view of an embodiment of the present invention in use.
Figure 5:
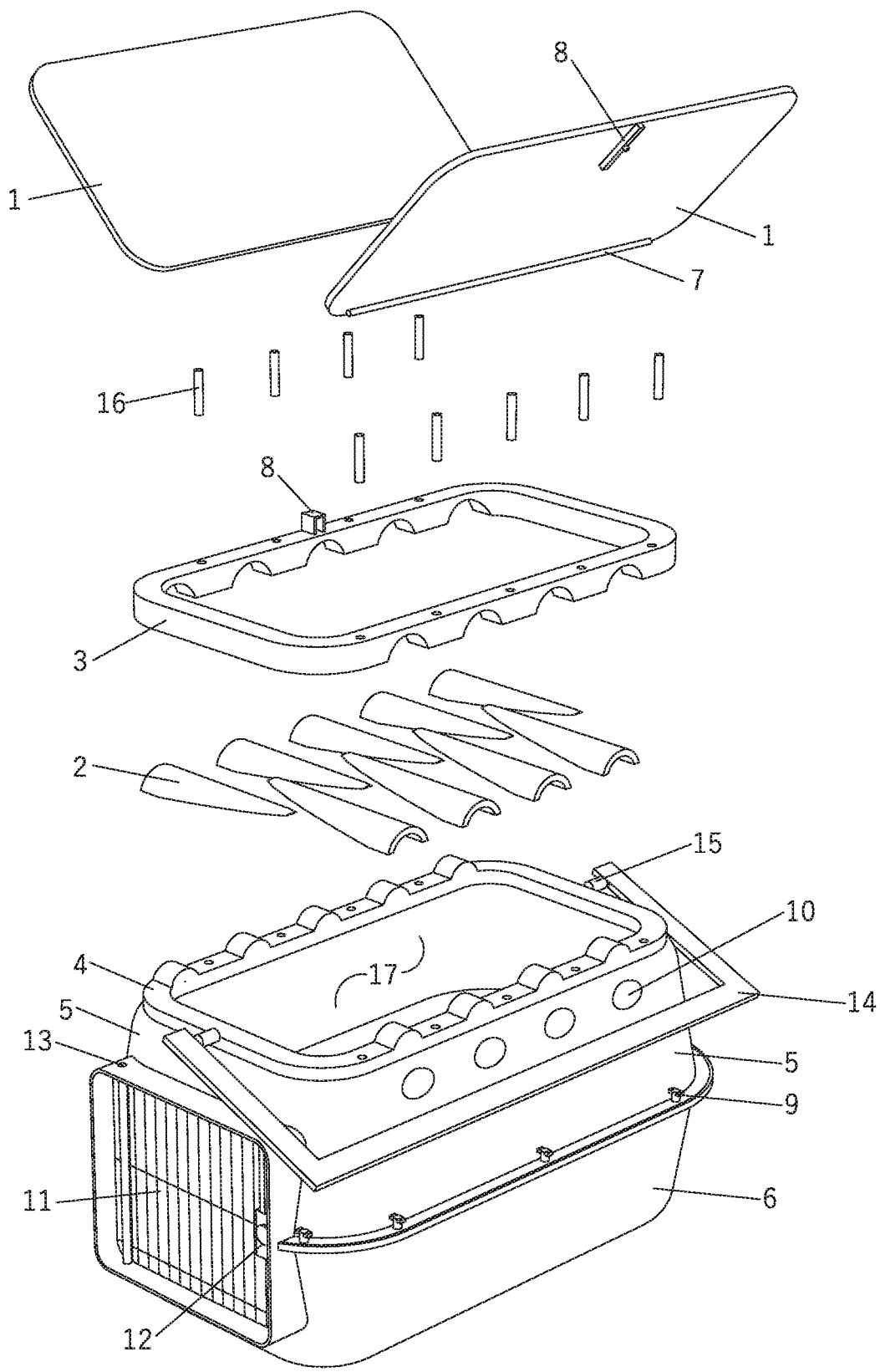
FIG. 5 is an exploded perspective view of the present invention.

Referring to FIGS. 1 through 5, the present invention includes an animal container. The animal container includes a housing 5, 6 sized to fit an animal, such as a pet 18, within. The housing 5, 6 includes a plurality of sides. The plurality of sides includes a first side having a first opening leading into the housing 5, 6 and a second side having a second opening leading into the housing 5, 6. A gate 2 is secured to the housing 5, 6 and is spring biased in a closed position covering the first opening. The gate 2 pivots against the spring bias in a direction towards an interior 17 of the housing 5, 6 when a force is applied against the gate 2 from outside of the housing 5, 6. A first door 11 is secured to the housing 5, 6 and covers the second opening.

The gate 2 of the present invention may be secured to the housing 5, 6 by a hinge and a spring. Alternatively, the gate 2 may include a plurality of arms made of a flexible resilient material. The flexible resilient material may be made of a material having a rubber elasticity, such as rubber, silicone, bendable plastics and the like.

Each of the plurality arms may include an elongated body having a distal end opposite a proximal end. The proximal ends of each of the plurality of arms may be attached to the housing 5, 6 and extend inward, covering the top opening of the housing 5, 6. The plurality of arms may alternate between being attached to a first side and a second side opposite the first side of the first opening. Therefore, the plurality of arms may overlap side by side. The plurality of arms may be disposed within the same plane. Each of the arms may taper in width from the proximal end to the distal end. In certain embodiments, each of the plurality of arms may include an upper surface having a convex shape and a lower surface having a concave shape, forming a shape similar to a half pipe. Therefore, the plurality of arms may easily bend in a direction towards the interior 17 of the housing 5, 6 but resist bending in the opposite direction.

The series of arms may be sufficiently flexible to allow an animal weighing as little as 4 pounds to pass through by gravity alone. The plurality of arms may be sufficiently spaced to allow gaps no larger than about 1 inch across when fully closed. The arms operate flexibly in one direction only and cannot easily be bent in the opposite direction, and which automatically return to the original position through mechanical memory of the component material.

In certain embodiments, the present invention includes a rigid frame top 3 and a rigid frame bottom 4 securing the arms therebetween. Each of the rigid frame top 3 and the rigid frame bottom 4 include an outer frame forming an opening aligning with the top opening of the housing 5, 6. The rigid frame top 3 may include a plurality of concave notches that align with a plurality of convex protrusions extending from the rigid frame bottom 4. The proximal end of the each of the arms are sandwiched in between the convex protrusions and the concave notches. The rigid frame top 3 and the rigid frame bottom 4 may be secured together and to the top of the housing 5, 6 by bolts 16 running through aligning openings.

As mentioned above, the present invention includes a first door 11 covering the second opening. The second opening is of sufficient size to allow passage of the animal. The first door 11 includes a lock 12 to prevent the animal from escaping. A user may place an animal through the gate 2 and the first opening for transport. Then, when releasing the animal from the housing 5, 6, the first door 11 may be unlocked and opened for the animal may walk out of the housing 5, 6. In certain embodiments, the first door 11 is secured to the housing 5, 6 by a hinge 13 and is pivotable away from an interior of the housing 5,6.

The present invention may further include a second door 1 secured to the housing 5, 6 by a hinge 7. The second door 1 covers the gate 2 and the first opening when closed. The second door 1 may include a first side door and a second side door hingedly attached to opposing sides of the first opening. The first and second side doors may overlap in a closed position. To open the second door 1, the first and second side doors may be pivoted away from each other and the top opening at about 100 degrees up to about 170 degrees, such as about 135 degrees, from the initial closed position. A stopper may prevent the side doors from pivoting beyond the obtuse angle, such as at about 135 degree angle. Therefore, the side doors may be in the shape of hopper and act as a funnel when opened. The animal may be placed through the gate 2 and the second door 1 may be closed. A latch 8 may be used to lock the second door 1 in a closed position. The second door 1 provides a funnel to aid in placing the animal within the housing 5, 6 and adds additional closure, preventing the animal from escaping the housing 5, 6.

The housing 5, 6 may include a top shell 5 and a bottom shell 6 secured together by hand-tightened fasteners 9. The plurality of sides of the housing 5, 6 may include a top, a bottom opposite the top, a first side, a second side opposite the first side, a front and a rear opposite the front. The first side and the second side may each include a plurality of apertures 10 for air circulation. The first opening may be formed through the top and the second opening may be formed through the front. The first opening on the top of the housing 5, 6 is sufficient in size to allow ingress of a small pet 18, such as a cat or dog. The weight of the pet 18 may aid a user while placing the pet 18 through the gate 2 and the pet 18 may walk out of the second opening without assistance from the user. The present invention may further include a handle 14 secured to the housing 5, 6 by pivot pins 15. A user may use the handle 14 to carry the housing 5, 6.

An animal is lowered into the opening in the top of the container. Contact with the arms lining the opening causes them to be flexed in one direction toward the interior of the container. The flexed arms allow temporary ingress towards the interior of the container. As contact with the arms is lost, they automatically return to the resting position such that they prevent movement by the animal towards the outside of the container. The top hinged door is closed over the opening and is secured to further prevent egress from the container. A side door located on a different side of the container can be opened to allow egress of the animal as desired.

The door over the opening in the top of the container is optional as long as the resilient arms are sufficient to contain the animal inside the container over long periods. The present invention should be understood to include a collapsible version or otherwise able to be disassembled into smaller parts to allow for storage and transportation.

The housing may be constructed of any suitable material such as fabric, plastic, wood or metal. Moreover, each element/component of the device may conveniently be fabricated from a different material. As mentioned above, the arms should be made of materials which permit ingress of the animal into the container but prevent its egress and is thereby sufficiently flexible to allow entry into the container of an animal solely by virtue of the animal's weight and, yet, be sufficiently rigid in the opposite direction to prevent egress.

It should be understood, of course, that the foregoing relates to exemplary embodiments of the invention and that modifications may be made without departing from the spirit and scope of the invention as set forth in the following claims.

What is claimed is:

1. An animal container comprising:
   a housing sized to fit an animal within, wherein the housing comprises a plurality of sides comprising a top, a bottom opposite the top, a first side, a second side opposite the first side, a front and a rear opposite the front, wherein the top comprises a first opening into the housing and the front comprises a second opening into the housing;
   a plurality of arms made of flexible resilient material, the plurality of arms coupled to opposing sides of the top and extending towards one another to cover the first opening, wherein the plurality of arms pivot inward in a direction towards the bottom of the housing when a force is applied against the plurality of arms from above the housing and the plurality of arms return to an original position to cover the first opening; and
   a first door secured to the housing and covering the second opening, wherein the each of the plurality of arms comprise a top surface comprising a convex shape and a bottom surface comprising a concave shape.

2. The animal container of claim 1, wherein the first door is secured to the housing by a hinge and is pivotable away from an interior of the housing.

3. The animal container of claim 1, further comprising a second door secured to the housing by a hinge, wherein the second door covers the plurality of arms and the first opening in a closed position.

4. The animal container of claim 1, wherein a proximal end of each of the plurality of arms alternate between being attached to the opposing sides of the first opening.

5. The animal container of claim 1, further comprising a handle secured to the housing.

6. An animal container comprising:
   a housing sized to fit an animal within, wherein the housing comprises a plurality of sides comprising a top, a bottom opposite the top, a first side, a second side opposite the first side, a front and a rear opposite the front, wherein the top comprises a first opening into the housing and the front comprises a second opening into the housing;

a plurality of arms made of flexible resilient material and each of the plurality of arms comprising a top surface comprising a convex shape and a bottom surface comprising a concave shape, the plurality of arms coupled to opposing sides of the top and extending towards one another to cover the first opening, wherein the plurality of arms pivot inward in a direction towards the bottom of the housing when a force is applied against the plurality of arms from above the housing and the plurality of arms return to an original position to cover the first opening; and a first door secured to the housing and covering the second opening.

* * * * *